United States Patent [19]

Gillemot et al.

[11] 4,029,626

[45] June 14, 1977

[54] POLYURETHANE COMPOSITION HAVING EASY-REENTRY PROPERTY

[75] Inventors: George W. Gillemot, Santa Monica; Robert Gamero, Whittier; Augusto E. Benavides, Granada Hills; Robert James Elms, Sepulveda, all of Calif.

[73] Assignees: Communications Technology Corporation; John T. Thompson, both of Los Angeles, Calif. ; part interest to each

[22] Filed: Nov. 24, 1975

[21] Appl. No.: 634,866

[52] U.S. Cl. .................... 260/31.6; 260/18 TN; 260/31.2 N; 260/31.4 R; 260/31.8 R; 260/31.8 G; 260/31.8 W; 260/77.5 AC; 428/373

[51] Int. Cl.² .................................. C08K 5/11

[58] Field of Search ........ 260/31.6, 31.8 R, 31.8 G, 260/31.8 W, 77.5 AC, 31.2 N, 31.4 R, 18 TN

[56] References Cited

UNITED STATES PATENTS 3,639,952   2/1972   Thompson et al. ........... 24/255 BC

*Primary Examiner*—Stanford M. Levin
*Attorney, Agent, or Firm*—Harris, Kern, Wallen & Tinsley

[57] ABSTRACT

This invention is directed to liquid polyurethane compositions made from a prepolymer and a curing solution. The prepolymer is made from organic diisocyanate, aliphatic triol, and liquid organic plasticizer material compatible with the composition and having an NCO content of about 1.2–2.5%. The prepolymer is cured with a solution composition of urethane curing agent, liquid organic plasticizer compatible with the cured composition, and an organo-metallic catalyst effective at ambient temperature. The cured polyurethane composition is a resilient solid which is waterproof and crumbles under shearing force applied to the surface or interior of the solid to permit easy breakaway or reentry into a cable splice or a surface which is encapsulated, embedded or coated with said solid.

13 Claims, No Drawings

POLYURETHANE COMPOSITION HAVING EASY-REENTRY PROPERTY

BACKGROUND OF THE INVENTION

This invention relates to solid polyurethane compositions for encapsulating, embedding or surface protective coating a solid article to which future access (reentry) is desired, and also to a two part package assembly for manufacturing said polyurethane composition, said assembly consisting of a package of liquid polyurethane prepolymer composition and of a liquid curing solution therefor.

Since approximately 1955, when the intial use of plastic sheath telephone cable began to be used by the operating telephone companies in the United States, there have been a variety of methods and techniques concerning the protection of splice connections. These have varied from such devices as hermetically sealed metal and plastic cases, to multiple layers of tape wrappings, adaptation of lead sleeving, plastic and metal devices having rubber and neoprene grommets, as well as total encapsulation in many varied closures using such diversified fillers as paraffin, wax, tar, epoxy, and polyurethanes. More recently, there have been a number of attempts to utilize polyethylene jelly and variations of this type material for waterproof encapsulation of wire connections. However, these polyethylene materials are not entirely reenterable and are not satisfactory.

The ever increasing application of buried wire and cable has brought about the requirements to develop a more foolproof closure method for both new splicing as well as repair of damaged wire and cable that would result in extremely high waterproof integrity, yet not involve undue cost for materials nor excessive time in labor required to do the work. To date, for one reason or another, none of the closure systems offered meet all of the demanding requirements of the operating telephone companies, namely, a closure system that is quickly reenterable, safe on any type plastic insulated wire, simple and quick to use, and inexpensive.

The material which most nearly met the above requirements was developed a few years ago and is a soft cable jelly, commercially available as ICKYPIC II Cable Jelly. Unlike other jellies, this material could be safely used on older polyethylene insulated conductors, as well as on the newer polypropylene insulated conductors. This meant that it could be applied on all existing plastic sheath cables used since 1955 in the Telephone Industry throughout the United States. Although highly successful, it sticks to the workmen's tools, clothes, other pieces of material and is objectionable on that basis. While meeting many desirable requirements as previously mentioned above, it was obviously not a satisfactory solution for waterproof encapsulation of telephone cable and service wire splices.

SUMMARY OF THE INVENTION

The disadvantages and problems of prior closure systems as aforesaid are overcome by the polyurethane composition provided for herein. This polyurethane composition is preferably manufactured by a two part package assembly of liquid prepolymer and curing agent as described hereinafter.

A. LIQUID POLYURETHANE PREPOLYMER COMPOSITION

Prepolymer A

The liquid polyurethane prepolymer composition comprises an NCO (isocyanate) group containing composition made from:
a. organic diisocyanate;
b. aliphatic triol of a molecular weight of about 1500–6000 comprising the bulk of the weight of said prepolymer and wherein the NCO/OH ratio of said diisocyanate and said triol is about 1.0–1.6; and
c. liquid, organic plasticizer material essentially inert to NCO reaction and essentially compatible with the diisocyanate-triol reaction product, said organic plasticizer being present in an amount to provide a composition having an NCO content of about 1.2–2.5%

Hereinafter, the aforesaid prepolymer composition is referred to as "Prepolymer A", and the more specific prepolymers described hereinafter are refined to as "Prepolymer $A_1$" and "Prepolymer $A_2$".

Prepolymer $A_1$

A more specific liquid polyurethane prepolymer composition comprises an NCO group containing composition made from:
a. aromatic diisocyanate;
b. polyoxypropylene derivative of alkanetriol where alkane has 3–6 carbon atoms, having a molecular weight of about 1500–6000, wherein the NCO/OH ratio of said diisocyanate and said triol derivative is about 1.3; and
c. liquid, plasticizer ester of (i) alkanol, alkanediol oxyalkylenediol, or polyoxyalkylenediol and (ii) alkanoic acid or alkanedioic acid, said ester is essentially compatible with the diisocyanate-trial derivative reaction product, and has a viscosity of not more than about 75 centipoises at about 20° C; said ester being present in an amount to provide a composition having an NCO content of about 1.5–1.8% and a viscosity of about 1300–1800 centipoises at 21.1° C (70° F).

Prepolymer $A_2$

A more specific liquid polyurethane prepolymer composition comprises an NCO group containing composition made from:
a. about 7.1 parts of tolylene diisocyanate; about 68.1 parts of polyoxypropylene-triol of molecular weight about 4500; and
c. about 24.9 parts of dioctyl adipate, said composition having an NCO content of about 1 weight percent and a viscosity of about centipoises at 21.1° C (70° F).

B. THE CURING SOLUTION COMPOSITION

CURING SOLUTION B

Curing solution composition for use with Prepolymer A comprises:
a. a curing agent, in a curing amount, for the polyurethane prepolymer composition of Prepolymer A selected from the class consisting of organic diamines and aminoalkanols;
b. liquid, organic plasticizer material essentially inert to NCO reaction and essentially compatible with cured, solid polyurethane composition of this invention; and
c. organo-metallic compound effective for catalyzing the ambient temperature reaction of isocyanate groups and hydroxyl or amine groups; and soluble in said plasticizer (b) above.

Hereinafter, the aforesaid curing solution composition will be referred to as "curing solution B", and the more specific curing solutions described hereinafter are referred to as "Curing Solution $B_1$" and "Curing Solution $B_2$".

Curing Solution $B_1$

A more specific curing solution composition of the invention comprises:
a. a curing agent, in a curing amount, for the polyurethane prepolymer composition of Prepolymer A selected from the class consisting of aromatic diamines, aliphatic diamines and aminoalkanols;
b. liquid, plasticizer ester of (i) alkanol, alkanediol, oxyalkylenediol, or polyoxyalkylenediol and (ii) alkanoic acid or alkanedioic acid, said ester being essentially compatible with the cured, solid polyurethane composition of this invention; and
c. a soluble organo-metallic compound effective for catalyzing the ambient temperature reaction of isocyanate groups with hydroxyl or amine groups.

Curing Solution $B_2$

A more specific curing solution of the invention comprises:
a. about 2.7 parts of N,N,N'N'-tetrakis (2-hydroxypropyl)-ethylene diamine curing agent;
b. about 97.3 parts of liquid, plasticizer 2,2,4-trimethyl-1,3-pentanediol diisobutyrate, about 97.3 weight parts; and
c. about 0.04 parts of a soluble lead catalyst, such as lead octoate.

C. THE 'CURED' SOLID POLYURETHANE COMPOSITION

The solid, polyurethane composition of the invention possesses structural strength against rebounding forces and also possesses the characteristic of crumbling under shearing force applied to the surface of the solid or from the interior of the solid, permitting the solid to be removed from another solid object encapsulated by, or embedded in, or protective coated on a surface thereof, of said solid polyurethane. The solid polyurethane composition comprises:
I. aforesaid prepolymer A; and
II. aforesaid curing solution B; said prepolymer A and said curing solution B when intermingled cure, at ambient temperatures, to solid polyurethane composition possessing the aforesaid crumbling characteristic.

A more specific solid polyurethane composition of the invention, possessing the characteristic set forth hereinabove, comprises:
I. aforesaid prepolymer $A_1$; and
II. aforesaid curing solution $B_1$, in an amount to produce a solid polyurethane composition having a Shore hardness of about 7–15 in a time of not more than about 30 minutes at about 20° C and possessed of the aforesaid crumbling characteristic.

Another specific example of the solid polyurethane composition of the invention, possessing the hereinabove set forth characteristics, comprises:

I. the foresaid prepolymer $A_2$; and
II. the aforesaid curing solution $B_2$, wherein when about equal weight parts of (I) and (II) are intermingled at about 21.1° C a solid polyurethane having a Shore hardness of about 10 is obtained in about 10 minutes.

D. THE TWO PART PACKAGE ASSEMBLY

In another aspect, the invention is directed to a two part package assembly adapted for producing a solid polyurethane composition when the contents of the two parts are intermingled, which assembly consists essentially of:
I. a first package part containing aforesaid Prepolymer A; and
II. a second package part containing aforesaid curing solution B.

In a more specific aspect, the two part package assembly is adapted to produce a solid polyurethane composition when the contents of the two parts are intermingled, which assembly consists essentially of:
I. a first package part containing aforesaid prepolymer $A_1$; and
II. a second package part containing aforesaid curing solution $B_1$, in an amount to produce a solid polyurethane composition having a Shore hardness of about 7–5 in a time of not more than about 30 minutes at about 20° C.

Another example of a two part package assembly comprises:
I. a first package part containing aforesaid Prepolymer $A_2$; and
II. a second package part containing aforesaid curing solution $B_2$, wherein when about equal weight parts of (I) and (II) are intermingled at about 21.1° C, a solid polyurethane, having a Shore hardness of about 10 is obtained in about 10 minutes.

DESCRIPTION OF PREFERRED EMBODIMENTS

A. The Prepolymer Composition

The liquid polyurethane prepolymer composition of the invention may be prepared from any suitable organic diisocyanate. Particular classes used include: aromatic diisocyanates, alipatic diisocyanates; cycloaliphatic diisocyanates; and heterocyclic diisocyanates.

Illustrative aromatic diisocyanates are: the diisocyanates of tolylene, tolidine, xylylene, phenylene, naphthylene, dianisidine, 1-chloro-2,4-phenylene;
3,3'-dimethyl-4,4'-diphenylmethane;
4,4'-diphenylmethane;
3,3'-dimethyl-4,4'-biphenylene;
3,3'-dimethoxy-4,4'-biphenylene;
2,2',5,5'-teramethyl-4,4'-biphenylene;
4,4'-diphenylisopropylidene;
3,3'-dimethyl-4,4'-diphenyl; and
3,3'-dimethoxy-4,4'-diphenyl Illustrative aliphatic diisocyanates are the diisocyanates of methylene, ethylene, trimethylene, tetramethylene, hexamethylene, an 18 carbon fatty acid dimer; and methylenebis (cyclohexylisocyanate).

Illustrative cycloaliphatic diisocyanates are the dissocyanates of cyclohexylene diisocyanate, 1-isocyanato-3-isocyanatomethyl-3,5,5-trimethyl cyclohexane, and isophorone (3,5,5-trimethyl-2-cyclohexen-1-one diisocyanate).

A typical heterocyclic diisocyanate is furfurylidene diisocyanate.

The triol or mixture of triols used in preparing the prepolymer composition of the invention is an aliphatic triol of a molecular weight of about 1500–6000, and preferably 3000–6000. A suitable triol is a mixture of castor oil glycerides transesterified to improve reactivity with isocyanate groups. Other suitable triols are derivatives (adducts) of a trihydric compound with an alkylene oxide, or mixtures thereof, having 2–4 carbon atoms, such as, ethylene oxide, propylene oxide, and butylene oxide.

Preferred triols are the aliphatic triols which are polyoxyalkylene derivatives of alkanetriol, where the "alkylene" portion has 2–4 carbon atoms and the "alkane" portion has 3–10 carbon atoms. Especially preferred are: alkylene is propylene, alkane has 3–6 carbon atoms, and the derivative molecular weight is about 4000–5000. Illustrative alkanetriols are: glycerol (1,2,3-propanetriol), butanetriol, pentanetriol, hexanetriol, trimethylolethane, trimethylolpropane, and triethylolpropane.

The NCO/OH ratio of the diisocyanate and the triol in the prepolymer composition is about 1.0–1.6 and preferably is about 1.3.

The prepolymer composition of the invention includes about 20 to about 30 weight percent of a liquid, organic plasticizer material essentially inert to isocyanate (NCO) and essentially compatible with the prepolymer product itself. "Compatible" is used herein in the sense of "ability to become and to remain blended with " the liquid prepolymer and the solid polyurethane obtained by reaction of the prepolymer, either self-reaction or with a curing agent. Many compounds accepted as excellent plasticizers exhibit blooming, or exudation, or slight separation from the solid and liquid compositions on long storage, particularly at higher ambient temperatures. The term "essentially compatible" includes such plasticizer materials.

It is preferred that the plasticizer component comprise about 25 weight percent of the prepolymer, be neutral, inert to isocyanate, have low volatility, and relatively low viscosity, that is, not more than about 75 centipoises (cps) at 20° C. A vast number of suitale plasticizer materials are listed in Modern Plastics Encyclopedia, 1973–74 Edition.

A preferred plasticizer material is an ester of aliphatic hydroxy compound and aliphatic carboxylic acid or aromatic carboxylic acid. Especially preferred plasticizer materials are the esters of alkanol, alkanediol, oxyalkylenediol, or polyoxyalkylenediol and alkanoic acid or alkanedioic acid.

Especially preferred ester compounds are: dioctyl adipate which has a viscosity of about 12 cps and a boiling rage of about 214° C at 5 mm Hg pressure, and 2,2,4-trimethyl-1,3-pentanediol diisobutyrate. Other plasticizers of roughly these characteristics appear in said Modern Plastics Encyclopedia listings.

Inertness to NCO is essential in order to produce a "water-white" prepolymer and polyurethane composition, if desired. Even slight reactivity causes a white cloudiness to show in the product. However, this may be acceptable for many applications of the prepolymer and/or polyurethane composition of the invention.

The liquid polyurethane prepolymer composition has an NCO content of about 1.2–2.5%. The amount of NCO present determines, in the main, the speed with which gelation takes place on intermingling the prepolymer composition and the curing solution. Lower NCO contents favor faster times. With the components of prepolymer $A_2$ and curing solution $B_2$, it has been observed that 1.2–2.5% NCO corresponds roughly to about 5–60 minutes gelation time at a 70° F (21.1° C).

A preferred NCO content of the prepolymer composition is about 1.4–2.0%. For encapsulation of cable splices and cable and capping, an NCO content of about 1.5–1.8% is particularly preferred.

The bulk of the weight sum of the triol, diisocyanate, and plasticizer in the prepolymer is provided by the triol. Adjustments can be made in the viscosity of the prepolymer composition by controlling the amount of plasticizer. For cable work and like usage, sufficient plasticizer is present to provide a composition having a viscosity of about 1300–1800 cps at 70° F (21.1° C).

B. The Curing Solution

The liquid organic plasticizer material component of the curing solution is of the same scope as the plasticizer material present in the prepolymer composition except that the plasticizer should comprise about 50 to about 98 weight % of the curing solution. It is preferred that the particular plasticizer material in the curing solution comprise about 97% of the curing solution, and be the same as the plasticizer in the prepolymer composition, for example, if the prepolymer composition includes dioctyl adipate plasticizer then it is preferred that the curing solution include dioctyl adipate plasticizer.

An organo-metallic compound effective for catalyzing the ambient temperature reaction of isocyanate groups and hydroxyl groups or amino groups, which is soluble in the plasticizer component, is present in the curing solution. A large number of suitable organometallic compounds are known to be effective. The more common are the phenate, chlorophenate, naphthenate, oleate, linoresinate, ethylhexanoate, acetylacetonate, butoxide, salts of lead, iron, tin, cobalt, vanadium, titanium, copper, zinc, chromium, manganese and cadmium. Soluble lead salts, such as, lead octoate, lead naphthenate, lead oleate, and lead linoresinate, are preferred catalysts for use in this invention.

The amount of catalyst present is relatively small; it will be dependent on the type and amount of curing agent and the time of gelation desired. In general, the lead catalyst will be present in about 0.01–1.% of the total curing solution; and commonly 0.01–0.3%.

The curing solution includes a curing agent, either a polyol an organic diamine, or amino alcohol.

The organic diamines include the aromatic, apiphatic and cycloaliphatic diamines. Illustrative are: benzidine, phenylene diaminem methylenebis (chloraniline), diaminodiphenylmethane, trimethylene diamine, tetramethylene diamine, hexamethylene diamine, tetramethyl-1,3-butanediamine, and diethylcyclohexyldiamine.

The aminoalcohols such as aminoalkanols are known curing agents. Illustrative are ethanolamine, dimethylethanolamine, aminobenzyl alcohol, and N,N,N',N'-tetrakis(2-hydroxypropyl)-ethylene diamine.

Sufficient curing agent is used to obtain a solid polyurethane composition. The amount used will vary with the NCO content of the prepolymer composition and the particular curing agent, but, in general, the curing agent usage will range from about 1 percent to 5% by weight of the curing solution.

The plasticizer, curing agent and organometallic compound are matched to provide a solution of the three components. The plasticizer in the curing solution is present, in the amount of 100 parts minus the amout of curing agent and catalyst.

The Cured Solid Polyurethane Composition

In preparing the prepolymer composition, it is customary to blend the plasticizer component and the isocyanate component before adding the triol. The isocyanate removes any slight amount of water which may be dissolved in the plasticizer. Anhydrous materials do not need this precaution. The three components are intermingled at about 150°–170° F (65.6°–76.7° C), a typical prepolymer reaction temperature. The product is a viscous, liquid having a color from water-white to pale yellow. The curing solution may require heating to about 40° C (104° F) to bring all the diamine and catalyst into solution.

The prepolymer composition and the proper amount of curing solution are rapidly intermingled at ambient temperature. The blend is then applied to the surface of the object which is to be encapsulated, embedded, or coated as the case may be. The blend is maintained in place for the time needed for the liquid to gel. There is not significant exotherm in the reaction. The solid polyurethane product is resilient and usually crystal-clear; some reactions may produce a white cloudiness. The solid product adheres to the surface to which it is applied and is waterproof and an electrical insulator.

The unique property of this solid polyurethane product is its response to shearing force applied to a surface, such as, rubbing a finger on the surface, and its response to the shearing force of a wire embedded in a block of the solid product and withdrawn through the block. The solid crumbles in response to shearing force and breaks up into small pieces. The interface between the solid product and the other surface easily cleaves with some crumbling of the adjacent solid product surface, freeing the other surface of all of the solid product. Metal wires, plastic coated wires, paper coated wires, pull through the encapsulating solid product clean and are ready for "working". The crumbled material does not stick to skin or clothing, so presents no clean-up problems, as do all the prior art reenterable cable materials. Long storage tests indicate this crumbling property does not change with age.

Another veru desirable property of the solid polyurethane product is its ability to be added to itself. Fresh liquid composition applied to solid product appears to have perfect cohesion, effecting an absolute marriage of the old solid and the fresh solid at the surface. This property means that partial reentry into a splice encapsulated by the solid product is satisfactory; it is not necessary to remove the entire encapsulating material. Another benefit lies in the fact that this product does not expand or shrink upon solidification.

THE TWO PART PACKAGE

The aforedescribed prepolymer composition and the aforedescribed curing solution must be packaged separately for handling, shipping and storage. Therefore, a two part package is necessary and the two parts are normally handled and stored together and are spoken herein as a "two part package assembly". When the consumer wishes to prepare a batch of liquid blend for encapsulation or other use, the necessary amount of each part of the package assembly is measured out and the two amounts are intermingled and the blend is placed in contact with the surface to be protected and-/or insulated. Usually the two part package is sized so that the entire contents of each part are used in a single blending operation. It is desirable that the closure on at least the prepolymer composition package part be airtight to prevent ingress of atmospheric moisture which reacts with composition. The package may be any conventional container, such as, removable lid can, screw cap bottle, sealed can when the entire contents are to be used in a single blending operation, sealed plastic or metal tubes for very small jobs, and the like containers.

Especially useful for small or medium applications in the field is the unitary two part plastic package assembly disclosed in U.S. Pat. No. 3,639,952. This unitary plastic package comprises an elongated tubular plastic film open-ended container provided with a removable means placed transversely across the container at the midlength thereof to form two separate tubular portions, the desired amount of aforesaid prepolymer composition is placed in one portion whose open end is then sealed; and the desired amount of aforesaid curing composition is placed in the other portion whose open end is then sealed, whereby said two compositions are maintained separate until the separating means is removed. The two compositions are then intermingled within the plastic film container, and the blended flowable liquid composition is taken therefrom prior to gelation of the liquid composition, and placed into contact with the surface to be protected and/or insulated by the cured solid polyurethane product composition.

EXAMPLE

A prepolymer composition of the invention was prepared from the following components:

2,4-tolylene diisocyanate, 7.1 weight parts; polyoxypropylenetriol, 4500 molecular weight, 68.1 parts; and dioctyl adipate, 24.9 parts.

The diisocyanate and the adipate were placed in a vessel and heated at 160°–170° F (71.1°–76.7° C) for one hour. Then the triol was added to the vessel and the contents intermingled for two hours at the same temperature.

The prepolymer composition had an NCO content of 1 weight percent and a viscosity of centipoises at 70° F (21.1° C). It had a density of 8.30 lbs/gallon (US) and is substantially colorless. It had to be stored under a dry nitrogen atmosphere.

The curing composition was prepared from the following components: 2,2,4-trimethyl-1,3-pentanediol dissobutyrate, 97.3 weight parts; N,N,N',N'-tetrakis (2-hydroxypropyl)ethylene diamine, 2.7 parts; and lead octoate catalyst, 0.04 weight parts.

The three components were brought into solution by mixing at 100°–110° F (37.8°–43.3° C). The curing solution was clear in color, had a density of 7.95 lbs/gal (US) and a viscosity of about 40 cps at 70° F (21.1° C).

One part by weight of the prepolymer composition and one part by weight of the curing solution were thoroughly intermingled to form a homogeneous blend. The blend was applied to a bundle of plastic coated copper wires in an in-place filling. The blend gelled in 9–10 minutes at 70° F (21.1° C); another blend of the same composition gelled in 35 minutes at 40° F (4.4° C).

Some of the blend was placed in a gelling dish made of aluminum with rough vertical sides, 2.5 inches in diameter by 0.5 inches deep. The dish was filled to about 0.25 inches. There was no noticeable exotherm on curing. Also no noticeable expansion or shrinkage in volume of the material placed in the dish. After curing, the solid was essentially colorless. The solid depressed slightly under finger pressure but rebounded on release of pressure. The solid did not stick to the skin when pressed by the finger.

The solid adhered to the metal tightly and formed a watertight interface. However, the metal foil easily peeled away from the solid polyurethane and the bottom contact was easily overcome and the solid polyurethane disc slipped out of the dish.

It was observed the edges of the disc were rough from crumbling of the wall as the metal foil was peeled away. Rubbing the disc surface with fingers caused substantial crumbling of the material. Shearing force easily broke chunks from the edges of the disc. However, the disc when dropped several feet onto a hard floor did not shatter or break up. The disc bounced. When dropped on an edge, the disc bounced much like a rubber ball.

A test on the embedded (encapsulated) plastic coated wires revealed that the wires pulled sideways cut through the solid polyurethane mass and the plastic surface was free of the encapsulating material. The encapsulating solid broke up into pieces easily; these pieces did not stick to skin, clothing or to other surfaces on which they lay.

Tests showed that the solid polyurethane product is a good electrical insulator.

While the particular polyurethane composition having easy-reentry property herein shown and disclosed in detail is fully capable of attaining the objects and providing the advantages hereinbefore stated, it is to be understood that it is merely illustrative of the presently preferred embodiment of the invention and that no limitations are intended to the detail of construction or design herein shown.

We claim:

1. A two part package assembly adapted for producing a solid polyurethane composition when the contents of the two parts are intermingled, which assembly consists essentially of:
   I. a first package part containing an NCO group containing composition, which comprises liquid polyurethane prepolymer, made from;
      a. organic diisocyanate;
      b. aliphatic triol of a molecular weight of about 1500–6000, wherein the NCO/OH ratio of said diisocyanate and said triol is about 1.0–1.6; and
      c. liquid, organic plasticizer material essentially inert to NCO reaction and essentially compatible with the diisocyanate triol reaction product; said organic plasticizer being present in an amount to provide a composition having an NCO content of about 1.2–2.5 weight % and wherein said triol provides the bulk of the weight sum of the said diisocyanate, triol and organic plasticizer; and
   II. a second package part containing a curing solution composition consisting essentially of:
      a. a curing agent, in a curing amount, for the polyurethane prepolymer composition of (I) selected from the class consisting of organic diamines and aminoalkanols;
      b. liquid, organic plasticizer material essentially inert to NCO reaction and essentially compatible with the cured, solid polyurethane composition; and
      c. organo-metallic compound effective for catalyzing the ambient temperature reaction of isocyanate groups and hydroxyl or amine groups; and soluble in said plasticizer, wherein said first and second packages are intermingled in proportions to yield upon curing, a solid polyurethane composition having a Shore hardness of about 5–20 in a curing time of not more than about 60 minutes at about 20° C.

2. The package assembly of claim 1 wherein said curing agent is ethylene diamine.

3. The package assembly of claim 1 wherein said curing agent is N,N,N',N'-tetrakis(2-hydroxypropyl)ethylene diamine.

4. The package assembly of claim 1 wherein said plasticizer material of (II) is the same as the plasticizer material of (I).

5. The package assembly of claim 4 wherein said plasticizer material in (I) and (II) is 2,2,4-trimethyl-1,3-pentanediol diisobutyrate.

6. The package assembly of claim 4 wherein said plasticizer material in (I) and (II) is dioctyl adipate.

7. A two part package assembly adapted for producing a solid polyurethane composition when the contents of the two parts are intermingled, which assembly consists essentially of:
   I. a first package part containing an NCO group containing composition which comprises liquid polyurethane prepolymer, made from:
      a. aromatic diisocyanate;
      b. polyoxypropylene derivative of alkanetriol where alkane has 3–6 carbon atoms, having a molecular weight of about 15000–6000 wherein the NCO/OH ratio of said diisocyanate and said triol derivative is about 1.3; and
      c. liquid, plasticizer ester of (i) alkanol, alkanediol, oxyalkylenediol, or polyoxyalkylenediol and (ii) alkanoic acid or alkanedioic acid, said ester is essentially compatible with the diisocyanate-triol derivative reaction product, and has a viscosity of not more than about 75 centipoises at about 20° C, said ester being present in an amount to provide a composition having an NCO content of about 1.5–1.8% and a viscosity of about 1300–1800 centipoises at 21.1° C (70° F); and
   II. a second package part containing a curing solution composition consisting essentially of:
      a. a curing agent, in a curing amount, for the polyurethane prepolymer composition of (I) selected from the class of aromatic diamines and aliphatic diamines;
      b. liquid, plasticizer ester of (i) alkanol, alkanediol, oxyalkylenediol, or polyoxyalkylenediol and (ii) alkanoic acid or alkanedioic acid, said ester is essentially compatible with the cured, solid polyurethane composition; and
      c. a soluble organo-metallic compound effective for catalyzing the ambient temperature reaction of isocyanate groups with hydroxyl or amine groups, in an amount to produce a solid polyurethane composition having a Shore hardness of about 7–15 in a time of not more than about 30 minutes at about 20° C, wherein said first and second packages are intermingled in proportions to yield upon curing, a solid polyurethane composition having a Shore hardness of about 5–20 in a curing time of not more than about 60 minutes at about 20° C.

8. A two part package assembly adapted for producing a solid polyurethane composition when the contents of the two parts are intermingled, which assembly consists essentially of:
I. a first package part containing an NCO group containing composition which comprises liquid polyurethane prepolymer, made from:
   a. about 7.1 weight parts of tolylene diisocyanate;
   b. about 68.1 weight parts of polyoxypropylenealkanetriol of molecular weight about 4500 wherein said alkane has 3 to 6 carbon atoms; and
   c. about 24.9 weight parts of dioctyl adipate, said composition having an NCO content of about 1 weight percent and a viscosity of about 40 centipoises at 21.1° C (70° F); and
II. a second package part containing a solution of:
   a. about 2.7 weight parts of N,N,N',N'-tetrakis(2-hydroxypropyl)ethylene diamine curing agent;
   b. about 97.3 weight parts of liquid, plasticizer 2,2,4-trimethyl-1,3-pentanediol diisobutyrate; and
   c. about 0.04 parts of a soluble lead catalyst wherein when about equal weight parts of (I) and (II) are intermingled at about 21.1° C, a solid polyurethane, having a Shore hardness of about 10, is obtained in about 10 minutes.

9. A solid, polyurethane composition possessing structural strength against rebounding forces and also possessing the characteristic of crumbling under shearing force applied to the surface of the solid or from the interior of the solid, permitting the solid to be removed from another solid object which is encapsulated, embedded, or coated with said solid polyurethane which comprises the reaction product between an NCO group prepolymer and a curing solution, said NCO group prepolymer comprising:
I. an NCO group containing composition having liquid polyurethane prepolymer, made from:
   a. organic diisocyanate;
   b. aliphatic triol of a molecular weight of about 1500–6000 wherein the NCO/OH ratio of said diisocyanate and said triol is about 1.0–1.6; and
   c. liquid, organic plasticizer material essentially inert to NCO reaction and essentially compatible with the diisocyanate-triol reaction product, said organic plasticizer being present in an amount to provide a composition having an NCO content of about 1.2–2.5%, and said triol providing the bulk of the weight sum of the said diisocyanate, triol and organic plasticizer; and
II. said curing solution consisting essentially of:
   a. a curing agent, in a curing amount, for the polyurethane prepolymer composition of (I) selected from the class consisting of organic diamines and aminoalkanols;
   b. liquid, organic plasticizer material essentially inert to NCO reaction and essentially compatible with the cured, solid polyurethane composition; and
   c. organo-metallic compound effective for catalyzing the ambient temperature reaction of isocyanate groups and hydroxyl or amine groups; and soluble in said plasticizer; said prepolymer composition and said curing composition intermingled in proportions to yield upon curing, at ambient temperatures, a solid polyurethane composition possessing the aforesaid crumbling characteristic and having a Shore hardness of about 5–20 in a curing time of not more than about 60 minutes at about 20° C.

10. The solid polyurethane composition of claim 9 wherein said catalyst amount of (II) and the NCO content of said prepolymer composition (I) are adjusted to provide on intermingling and curing a solid polyurethane composition having a Shore hardness of about 5–20 in a curing time of not more than about 60 minutes at about 20° C.

11. The solid polyurethane composition of claim 9 wherein said plasticizer material of (II) is the same as the plasticizer material of (I).

12. A solid, polyurethane composition possessing structural strength against rebounding forces and also possessing the characteristic of crumbling under shearing force applied to the surface of the solid or from the interior of the solid, permitting the solid to be removed from another solid object which is encapsulated, embedded, or coated with said solid polyurethane which comprises the reaction product between an NCO group prepolymer and a curing solution, said NCO group prepolymer comprising:
I. an NCO group containing composition comprising liquid polyurethane prepolymer, made from:
   a. aromatic diisocyanate;
   b. polyoxypropylene derivative of alkanetriol where alkane has 3–6 carbon atoms, having a molecular weight of about 1500–6000, the NCO/OH ratio of said diisocyanate and said triol derivative charged is about 1.3; and
   c. liquid, plasticizer ester of (i) alkanol, alkanediol oxyalkylenediol, or polyoxyalkylenediol and (ii) alkanoic acid or alkanedioic acid, said ester being essentially compatible with the diisocyanate-triol derivative reaction product, and having a viscosity of not more than about 75 centipoises at about 20° C, said ester being present in an amount to provide a composition having an NCO content of about 1.5–1.8% and a viscosity of about 1300–1800 centipoises at 21.1° C (70° F); and
II. said curing solution consisting essentially of:
   a. a curing agent, in a curing amount, for the polyurethane prepolymer composition of (I) selected from the class of aromatic diamines and aliphatic diamines;
   b. liquid, plasticizer ester of (i) alkanol, alkanediol, oxyalkylenediol, or polyoxyalkylenediol and (ii) alkanoic acid or alkanedioic acid, said ester is essentially compatible with the cured, solid polyurethane composition; and
   c. a soluble organo-metallic compound effective for catalyzing the ambient temperature reaction of isocyanate grouos with hydroxyl or amine groups, in an amount to produce a solid polyurethane composition having a Shore hardness of about 7–15 in a time of not more than about 30 minutes at about 20° C and possessed of the aforesaid crumbling characteristic.

13. A solid, polyurethane composition possessing structural strength against rebounding forces and also possessing the characteristic of crumbling under shearing force applied to the surface of the solid or from the interior of the solid, permitting the solid to be removed from another solid object which is encapsulated, embedded, or coated with said solid polyurethane which comprises the reaction product between an NCO group prepolymer and a curing solution, said NCO group prepolymer comprising:

I. an NCO group containing composition which comprises liquid polyurethane prepolymer, made from;
   a. about 7.1 weight parts of tolylene diisocyanate;
   b. about 68.1 weight parts of polyoxypropylene-alkane triol of molecular weight about 4500 wherein said alkane has 3 to 6 carbon atoms; and
   c. about 24.9 weight parts of dioctyl adipate;
   d. said composition having an NCO content of about 1 weight percent and a viscosity of about 40 centipoises at 21.1° C (70° F); and
II. said curing solution comprised of:
   a. about 2.7 weight parts of N,N,N',N'-tetrakis (2-hydroxypropyl)-ethylene diamine curing agent;
   b. about 97.3 weight parts of liquid, plasticizer 2,2,4-trimethyl-1,3-pentanediol diisobutyrate; and
   c. about 0.04 parts of a soluble lead catalyst, wherein when about equal weight parts of (I) and (II) are intermingled at about 21.1° C, a solid polyurethane, having a Shore hardness of about 10, is obtained in about 10 minutes.

* * * * *

UNITED STATES PATENT AND TRADEMARK OFFICE
CERTIFICATE OF CORRECTION

PATENT NO. : 4,029,626
DATED : June 14, 1977
INVENTOR(S) : George W. Gillemot et al It is certified that error appears in the above-identified patent and that said Letters Patent are hereby corrected as shown below:

Column 4, line 27, "7-5" should be -- 7-15 --.

Column 7, line 49, "surface" should be --interface--;

Column 7, line 45, " veru" should be --very--;

Column 12, line 53 "grouos" should be --groups--.

Signed and Sealed this

Twenty-seventh Day of September 1977

[SEAL]

Attest:

RUTH C. MASON
Attesting Officer

LUTRELLE F. PARKER
Acting Commissioner of Patents and Trademarks